United States Patent

Malagi et al.

(10) Patent No.: US 8,882,084 B2
(45) Date of Patent: Nov. 11, 2014

(54) VARIABLE CARBONATION USING IN-LINE CARBONATOR

(75) Inventors: Jayateertha Malagi, Karnataka (IN); Servesh Adderi Ranganath, Karnataka (IN)

(73) Assignee: Cornelius, Inc., St. Paul, MN (US)

( * ) Notice: Subject to any disclaimer, the term of this patent is extended or adjusted under 35 U.S.C. 154(b) by 268 days.

(21) Appl. No.: 13/337,397

(22) Filed: Dec. 27, 2011

(65) Prior Publication Data

US 2012/0177784 A1    Jul. 12, 2012

Related U.S. Application Data

(63) Continuation-in-part of application No. 13/171,957, filed on Jun. 29, 2011.

(60) Provisional application No. 61/398,631, filed on Jun. 29, 2010.

(51) Int. Cl.
*B01F 3/04* (2006.01)
*A23L 2/54* (2006.01)

(52) U.S. Cl.
CPC ......... *B01F 3/04808* (2013.01); *B01F 3/04815* (2013.01); *A23L 2/54* (2013.01); *B01F 2215/0468* (2013.01); *B01F 3/04758* (2013.01); *B01F 2215/0431* (2013.01)
USPC ................ 261/26; 261/27; 261/30; 261/34.1; 261/76; 261/78.2; 426/477; 99/323.1

(58) Field of Classification Search
CPC .... B01F 3/04; B01F 3/04106; B01F 3/04099; B01F 3/04787; B01F 3/04808
USPC ........ 261/26, 78.2, 76, 30, 34.1, 27; 426/477; 99/323.1
See application file for complete search history.

(56) References Cited

U.S. PATENT DOCUMENTS 3,780,198 A * 12/1973 Pahl et al. ............... 426/477
4,386,636 A    6/1983 Ellert
(Continued)

FOREIGN PATENT DOCUMENTS

DE        10250707 A1    5/2004
DE    202006002983 U1    4/2006
(Continued)

OTHER PUBLICATIONS

International Search Report from PCT/US2012/044300 filed Jun. 27, 2012; 5 pgs.

(Continued)

*Primary Examiner* — Robert A Hopkins
(74) *Attorney, Agent, or Firm* — Andrus Intellectual Property Law LLP (57) ABSTRACT

An inline carbonation apparatus includes a fluid tube having an inner diameter. At least one water orifice is linked to a water source and is attached at one end of the fluid tube. The water orifice atomizes water passing therethrough. A carbon dioxide source is connected to a carbon dioxide solenoid valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The carbon dioxide solenoid valve is opened and closed for a predetermined portion of a drink dispense time providing a volume of carbonated and non-carbonated fluid which upon mixing achieves a desired carbonation level.

22 Claims, 6 Drawing Sheets

(56) References Cited

U.S. PATENT DOCUMENTS

| | | | |
|---|---|---|---|
| 5,124,088 A | 6/1992 | Stumphauzer | |
| 5,510,060 A | 4/1996 | Knoll | |
| 5,842,600 A | 12/1998 | Singleterry et al. | |
| 6,758,462 B2 * | 7/2004 | Bellas et al. | 261/78.2 |
| 2006/0249536 A1 | 11/2006 | Hartman et al. | |
| 2006/0288874 A1 | 12/2006 | Ziesel | |

FOREIGN PATENT DOCUMENTS

| | | |
|---|---|---|
| DE | 202007003204 U1 | 7/2007 |
| DE | 102008032369 A1 | 1/2010 |
| EP | 1295844 A1 | 3/2003 |
| EP | 2070586 A1 | 6/2009 |
| FR | 2715581 A1 | 8/1995 |
| GB | 1274363 A | 5/1972 |
| GB | 2342594 A | 4/2000 |
| WO | 00-07707 A1 | 2/2000 |
| WO | 01/81238 A1 | 11/2001 |

OTHER PUBLICATIONS

International Search Report from corresponding PCT/US2011/042374 issued Feb. 24, 2012; 4 pgs.

International Search Report and Written Opinion for PCT/US2012044332 dated Sep. 18, 2012.

* cited by examiner

VARIABLE CARBONATION USING IN-LINE CARBONATOR

CROSS-REFERENCE TO RELATED APPLICATIONS

This application claims priority of U.S. Provisional Application No. 61/398,631 filed Jun. 29, 2010 and U.S. Utility application Ser. No. 13/171,957 filed Jun. 29, 2011, which are incorporated herein by reference.

FIELD OF THE INVENTION

The invention relates to carbonation apparatus and a method for forming a carbonated beverage.

BACKGROUND OF THE INVENTION

Generally it is known to provide carbonated beverages that utilize carbonated water. The carbonated water is generally formed using a carbonator tank into which water under pressure is introduced into the tank with carbon dioxide also under pressure. The pressure of the contents of the vessel forces the carbon dioxide into the water forming a carbonated water. Typically such carbonator tanks are bulky and large and increase the manufacturing cost of a beverage dispensing system. Additionally, a large carbonation tank significantly increases the footprint or size of a drink dispenser. Further, large carbonation tanks may provide a failure mode for a carbonated beverage system requiring an expensive replacement of the component.

There is therefore a need in the art for an improved carbonation system and method that provides a carbonated beverage without the use of a large carbonator tank.

SUMMARY OF THE INVENTION

In one aspect, an inline carbonation apparatus includes a fluid tube having an inner diameter. At least one water orifice is linked to a water source and is attached at one end of the fluid tube. The water orifice includes a plurality of holes atomizing water passing therethrough. A carbon dioxide source is connected to a carbon dioxide solenoid valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The carbon dioxide solenoid valve is opened and closed for a predetermined portion of a drink dispense time providing a volume of carbonated and non-carbonated fluid which upon mixing achieves a desired carbonation level.

In another aspect, an inline carbonation apparatus includes a fluid tube having an inner diameter. At least one water orifice is linked to a water source and is attached at one end of the fluid tube. The water orifice includes a plurality of holes atomizing water passing therethrough. A carbon dioxide source is connected to a carbon dioxide solenoid valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The carbon dioxide solenoid is pulsed during a drink dispense time providing fluid having a desired carbonation level.

The atomized water has a pressure less than the carbon dioxide such that carbon dioxide is absorbed into the water forming carbonated water having a specified volume of carbonation. A third zone or pipe flow zone is defined by the end of the mixing zone and transports the carbonated water.

In a further aspect, there is disclosed a beverage dispensing apparatus including at least one inline carbonation apparatus having a fluid tube having an inner diameter. At least one water orifice is linked to a water source and attached at one end of the fluid tube. The water orifice has a plurality of holes atomizing water passing therethrough. A carbon dioxide source is connected to a carbon dioxide solenoid valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The carbon dioxide solenoid valve is opened and closed for a predetermined portion of a drink dispense time providing a specified volume of carbonated fluid. A carbonated flow control is linked to another end of the fluid tube. A water flow control is linked to the water source. The carbonated and water flow controls are connected to a dispense valve. The carbonated and water flow controls regulate a volume of carbonated and non-carbonated fluid which upon mixing achieves a desired carbonation level.

In another aspect, there is disclosed a method of forming a carbonated beverage that includes the steps of providing a water supply and carbon dioxide supply linked to at least one inline carbonation apparatus having a fluid tube having an inner diameter; at least one water orifice linked to a water source and attached at one end of the fluid tube, the water orifice having a plurality of holes atomizing water passing therethrough; and a carbon dioxide source connected to a carbon dioxide solenoid valve, the carbon dioxide solenoid valve connected to a carbon dioxide regulator that is coupled to a carbon dioxide orifice and attached to the fluid tube in a spaced relationship from the water orifice; and introducing water and carbon dioxide into the inline carbonation apparatus and opening and closing the carbon dioxide solenoid valve for a predetermined portion of a drink dispense time providing a specified volume and level of carbonation of a carbonated fluid.

DETAILED DESCRIPTION OF THE PREFERRED EMBODIMENTS

Figure 1:
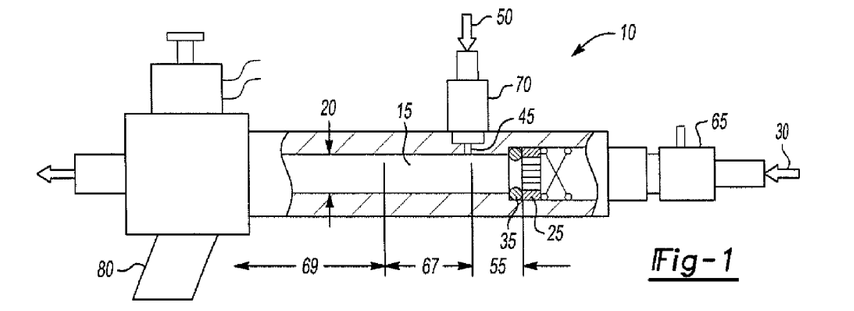
FIG. 1 is a schematic side view of an inline carbonation apparatus.

Referring to FIG. 1, there is shown an inline carbonation apparatus 10 that includes a fluid tube 15 having an inner diameter 20. At least one water orifice 25 is linked to a water source 30 and is attached at one end 35 of the fluid tube 15. The water orifice 25 may have a plurality of holes 40 that atomize water passing therethrough. A carbon dioxide orifice 45 is linked to a carbon dioxide source 50 and is attached to the fluid tube 15 in a spaced relationship from the water orifice 25. The atomized water exiting the water orifice 25 has a pressure that is less than the carbon dioxide such that carbon dioxide is absorbed into the water forming carbonated water having a specified volume of carbonation.

In one aspect, the carbon dioxide orifice 45 is spaced from the water orifice 25 a distance of from one quarter to three quarters of the diameter 20 of the fluid tube 15. This spacing defines a first free jet zone 55 within the inline carbonation apparatus 10. In one aspect, the plurality of holes 40 of the water orifice 25 may have a size ranging from 0.6 to 2.0 millimeters. Various numbers of holes 40 may be formed in the water orifice 25 to create the atomized jet of water.

The carbon dioxide orifice 45 also includes a plurality of holes 60 and may have a size ranging from 1 to 3 millimeters. Either of the water orifice 25 or the carbon dioxide orifice 45 may include a removable orifice plate such that various sized holes as well as various numbers of holes may be utilized in the water orifice 25 or carbon dioxide orifice 45. Alternatively, the water orifice 25 and carbon dioxide orifice 45 may have a fixed number of holes and have a fixed size. A second mixing zone 67 is defined by the carbon dioxide orifice 45 and extends a distance of from 1 to 6 times the inner diameter 20 of the fluid tube 15. The carbon dioxide is introduced into the atomized water in the mixing zone 67. A third pipe flow zone 69 starts at the end of the mixing zone 67 and transports the formed carbonated water through the carbonation apparatus 10.

As stated above, the atomized water exiting the water orifice 25 has a pressure less than the carbon dioxide such that carbon dioxide is absorbed into the water forming the carbonated water. In one aspect, a pressure difference between the atomized water and carbon dioxide is maintained from 5 to 20 psi forming carbonated water having from 2 to 3 volumes of carbonation. In another aspect, a pressure difference between the atomized water and carbon dioxide may be maintained from 30 to 40 psi forming carbonated water having from 3 to 4.5 volumes of carbonation.

As stated above, various volumes of carbonation may be specified by regulating the pressure drop of the water relative to the carbon dioxide. Additionally, water may be introduced into the water orifice 25 that has a pressure of from 80 to 150 psi with a carbon dioxide introduced into the carbon dioxide orifice 45 that has a pressure of from 50 to 120 psi. In this manner carbonated water having from 3 to 4.3 volumes of carbonation may be formed. In another aspect, water may be introduced into the water orifice 25 having a pressure of from 40 to 80 psi with a carbon dioxide introduced into the carbon dioxide orifice 45 having a pressure of from 20 to 60 psi. In this manner carbonated water having from 2 to 3 volumes of carbonation may be formed. Regulating the pressure of the incoming water and carbon dioxide and controlling a pressure drop of the water relative to the carbon dioxide allows for formation of various volume fractions of carbonated water. This allows the formation of beverages that have differing carbonation levels.

The inline carbonation apparatus 10 may include a water check valve 65 that is connected to the water supply 30 and to the water orifice 25 to prevent back flow of carbonated water into the water supply 30. Additionally, a carbon dioxide check valve 70 may be connected to the carbon dioxide supply 50 and to the carbon dioxide orifice 45. In one aspect, the carbon dioxide check valve may have a cracking pressure of less than 5 psi.

Figure 2:
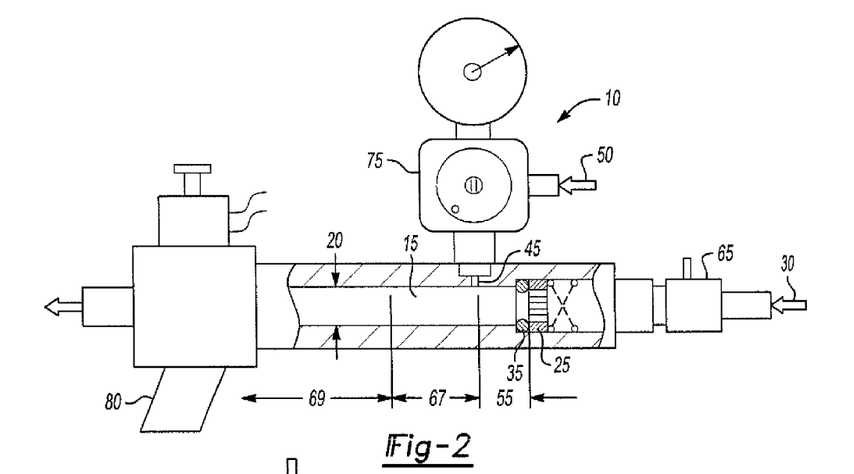
FIG. 2 is a side view schematic representation of an inline carbonation apparatus including a carbon dioxide pressure regulator.

Referring to FIG. 2, there is shown an embodiment of an inline carbonation apparatus 10 that includes a carbon dioxide regulator 75 directly mounted on the fluid tube 15. It should be realized that the carbon dioxide pressure may be regulated using various control mechanisms and systems as will be described in more detail below. Additionally, regulators may be positioned in alternate locations between the carbon dioxide orifice 45 and the source of carbon dioxide 50. In another aspect, the carbon dioxide regulator 75 may be integral with the carbon dioxide valve 70 or may be separate.

In another aspect, the inline carbonation apparatus 10 may include a solenoid valve 80 that is attached to the fluid tube 15. The solenoid valve 80 may prevent dispensing of a non carbonated water and links the fluid tube 15 to various dispensing valves 85. In one aspect, the solenoid valve may is attached to the fluid tube 15 and is positioned a distance 68 of from 4 to 12 times the diameter of the fluid tube 15 from the carbon dioxide orifice 50.

Figure 3:
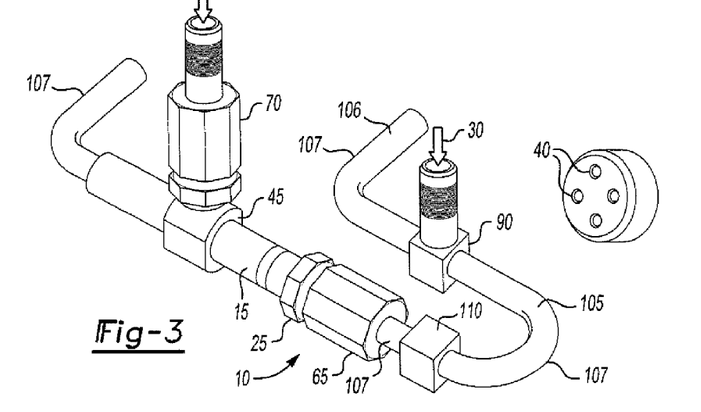
FIG. 3 is a partial perspective view of an inline carbonation apparatus including various attachment couplings and features.

The inline carbonation apparatus 10 may also include a splitting manifold 90 best seen in FIG. 3. The splitting manifold 90 may be connected to the water supply 30 and to the water check valve 65 to separate a non carbonated water source for dispensing. As can be seen in the figure, one leg or tube 100 from the splitting manifold 90 provides a non carbonated source of water while the other tube or connection 105 is linked to the inline carbonator apparatus 10. As can be seen in FIG. 3, multiple connections or tubes 107 may be included with the inline carbonation apparatus 10. In one aspect, various fittings and connections may be utilized. For example, quick disconnect features may be utilized for the check valves of the water orifice 25 and carbon dioxide orifice

45. Additionally, quick disconnect features for the water and tubing connections may also be included. Molded in barb features that connect to water and carbon dioxide tubing connections may also be utilized. Further, integrated solenoid valve mounting features may be included in inline carbonation apparatus 10. Such features and attachments allow the inline carbonation apparatus 10 to be easily assembled and disassembled allowing for quick repair and replacement.

In the embodiment depicted in FIG. 3, water is introduced into the splitting manifold 90 with one tube 100 providing a non carbonated water supply while the second tube 100 exits the splitting manifold 90 and connects with a pressure reducing or regulating valve 110. The pressure regulating valve 110 is coupled to a third tube 107 that is connected to a water check valve 65 having a cracking pressure of less than 5 psi. The water check valve 65 is coupled to a water orifice 25 that is connected to the fluid tube 15. A carbon dioxide check valve 70 is connected to the carbon dioxide orifice 45 that is linked with the fluid tube 15. The fluid tube 15 is further coupled to another tube section 107 that leads to a flow control or dispensing mechanism 85 for dispensing a carbonated beverage.

Figure 4:
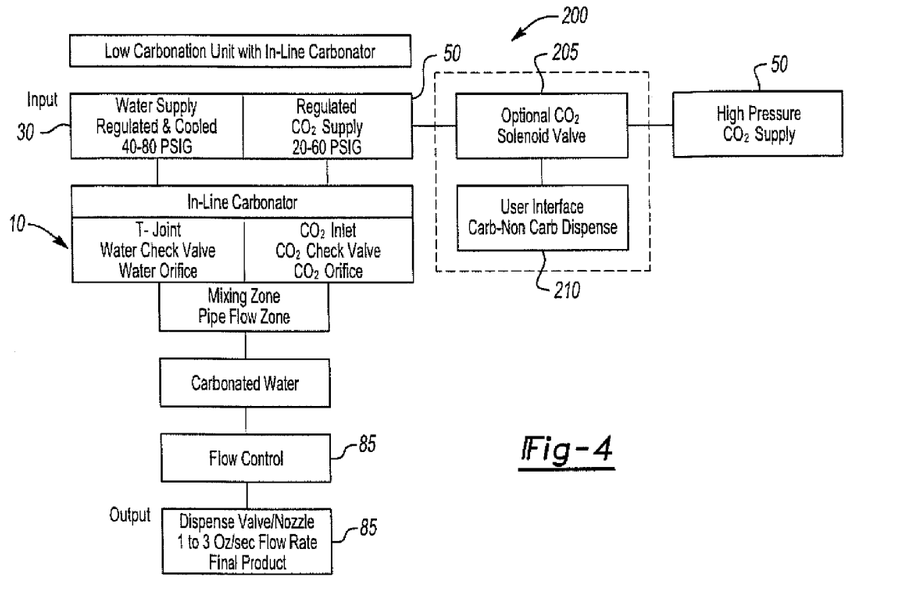
FIG. 4 is a block diagram of a beverage dispensing system that includes the inline carbonator and a $CO_2$ solenoid valve.
Figure 5:
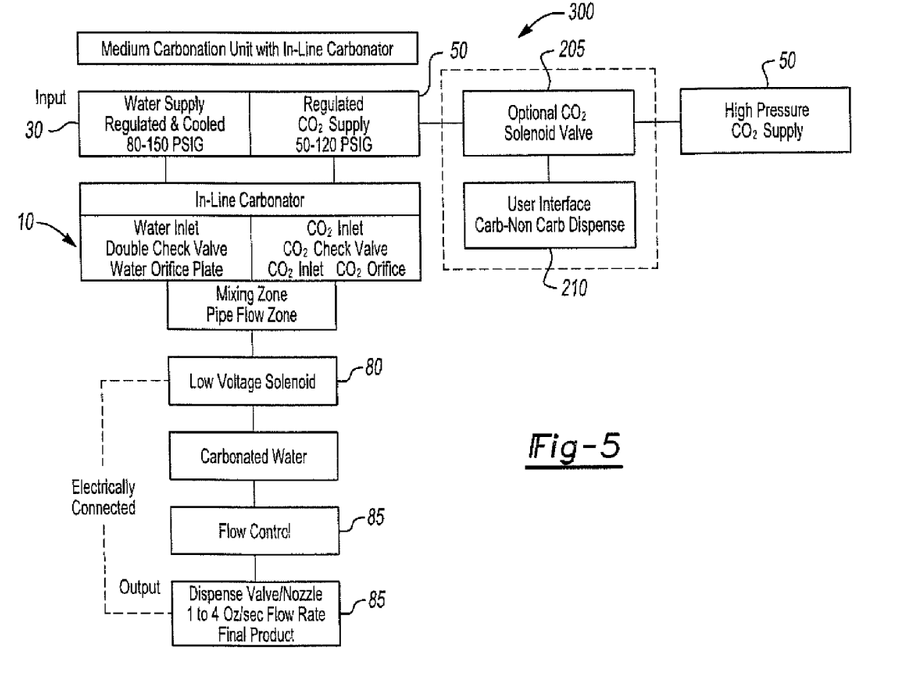
FIG. 5 is a block diagram of a beverage dispensing system including an inline carbonator having a $CO_2$ solenoid valve and a low voltage solenoid valve controlling dispensing of a carbonated beverage.

Referring to FIGS. 4 and 5, there are shown block diagrams for a beverage dispensing apparatus 200 that includes the inline carbonation apparatus 10. As shown in FIG. 4, a water supply 30 and carbon dioxide supply 50 are connected to the inline carbonation apparatus 10. A carbon dioxide valve 205 is connected to the carbon dioxide supply 50 and may be utilized to switch between carbonated and non carbonated water dispensed at the option of a user interface 210. The inline carbonation apparatus 10 produces a carbonated water which is sent to a flow control section 85 to dispense carbonated water at a specified flow rate to form a final dispensed beverage product. The flow control section 85 may include multiple valves or a single valve linked with a single inline carbonator 10 or multiple inline carbonators 10.

Referring to FIG. 5, there is shown a beverage dispensing apparatus 300 that includes the inline carbonation apparatus that is connected to a water supply 30 and a carbon dioxide supply 50. As with the previously described FIG. 4, a carbon dioxide valve 205 may be linked with a user interface 210 to supply both carbonated and non carbonated water for a beverage dispensing system. Additionally, a low voltage solenoid 80 may be included as part of a flow control system to regulate and dispense carbonated water to a dispensing valve or nozzle 85 to produce a final carbonated beverage product.

Figure 6:
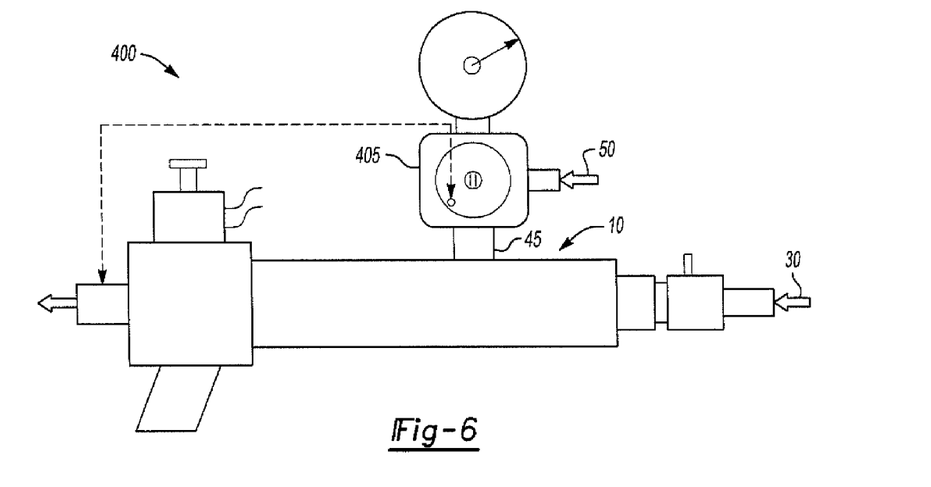
FIG. 6 is a side schematic view of an inline carbonation apparatus having a feedback control mechanism that dynamically adjusts $CO_2$ pressure.

Various feedback and control mechanisms may be utilized to control the carbon dioxide and water pressures introduced into the inline carbonation apparatus 10. Referring to FIG. 6, there is shown a feedback control mechanism 400 that may be utilized to dynamically adjust a carbon dioxide pressure to compensate for water pressure variations. As shown in the figure, a pressure signal of the carbonated water exiting the inline carbonator 10 is fed back into a differential pressure regulator 405 coupled to the carbon dioxide orifice 45. The differential pressure regulator 405 adjusts the diaphragm inside the regulator to dynamically change the water pressure on the other side of the diaphragm to maintain a constant carbon dioxide to water pressure differential.

Figure 7:
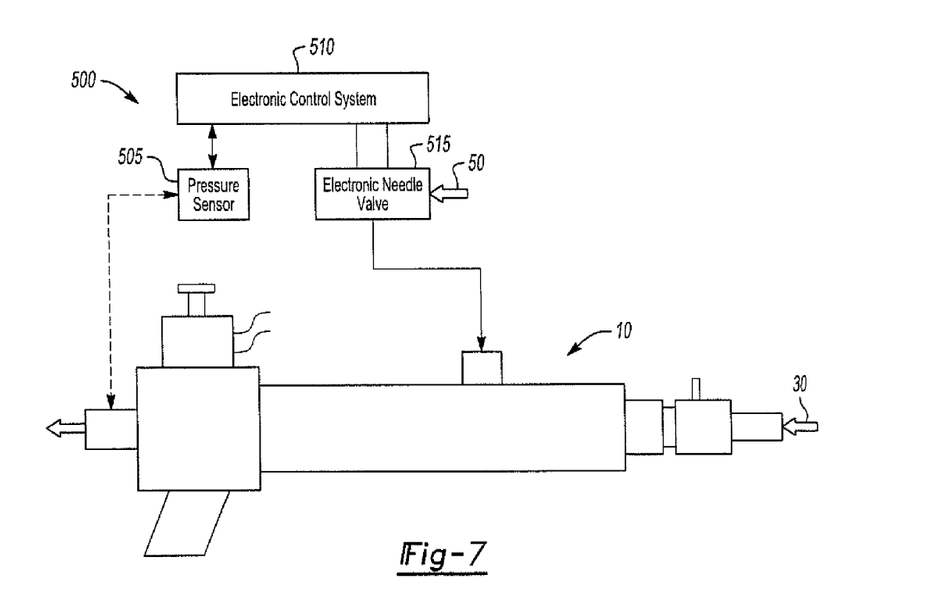
FIG. 7 is a side schematic view of an inline carbonation apparatus including an alternate feedback control system that includes a pressure sensor and logic that controls an electronic needle valve of the carbon dioxide.

Referring to FIG. 7, there is shown an alternate feedback and control mechanism 500 that utilizes a pressure sensor 505 and a control logic system 510 that is coupled to an electronic needle valve 515. The pressure of the carbonated water exiting the inline carbonator 10 is sensed and is continuously fed back into the control or electronic control system 510. The electronic control system 510 automatically adjusts the needle valve 515 to maintain a pressure differential between the atomized water and carbon dioxide introduced into the inline carbonator 10.

Figure 8:
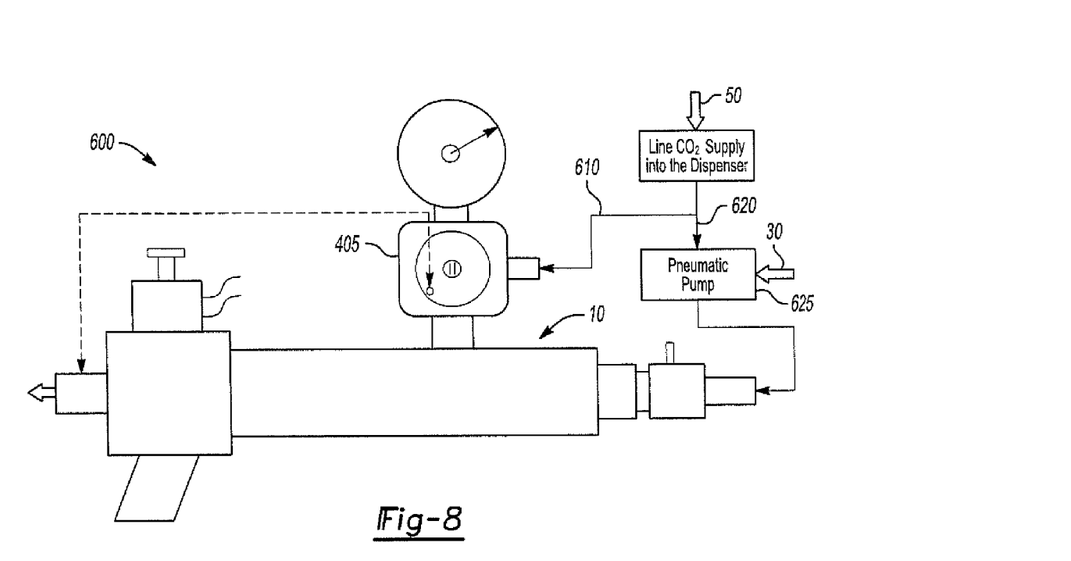
FIG. 8 is a side schematic view of an inline carbonation apparatus including a feedback control mechanism including a differential pressure mechanism that controls a pneumatic pump supplying water to the system.

Referring to FIG. 8, there is shown another feedback control mechanism 600 that may be utilized to dynamically adjust water pressure to accommodate carbon dioxide pressure variations. As can be seen in the figure, the feedback control mechanism 600 includes a differential pressure mechanism 405 that was previously described in FIG. 6. The incoming carbon dioxide is split into two branches 610, 620. One branch 610 feeds the differential pressure regulating mechanism 405 while the other branch 620 is utilized to drive a pneumatic pump 625 which in turn feeds water into the inline carbonator 10. A pressure variation in the incoming carbon dioxide will equally affect both the differential pressure regulating mechanism 405 and the pneumatic pump 625 pressure. Therefore when the pressure drops the pump 625 will have a lower incoming carbon dioxide pressure which will affect the water pressure. The lower water pressure coming into the inline carbonator 10 is sensed by the differential pressure regulating mechanism 405 and adjusts the carbon dioxide pressure into the carbon dioxide orifice 45.

Figure 9:
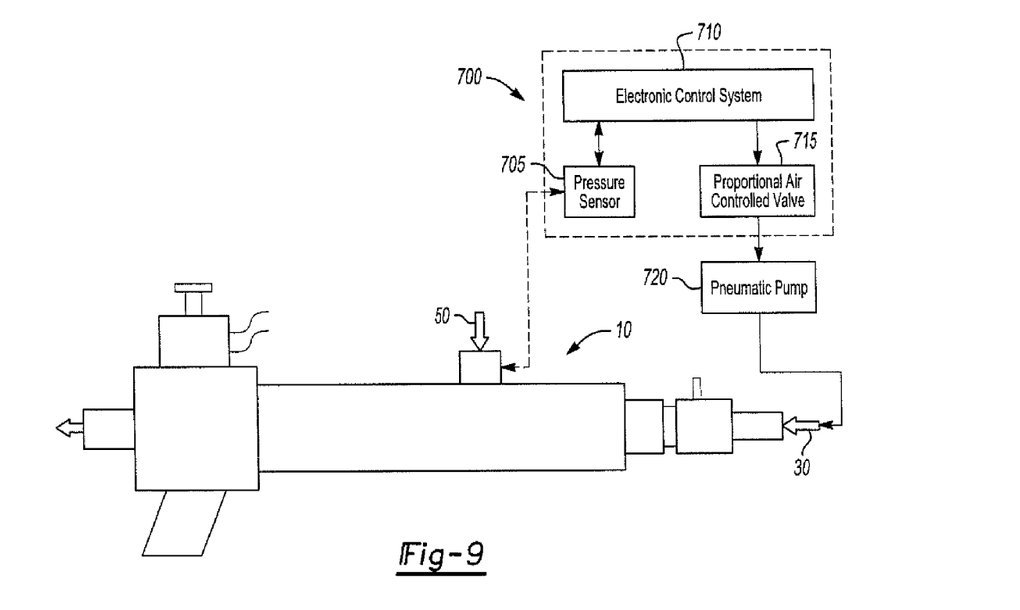
FIG. 9 is a side schematic view of an inline carbonation apparatus including a feedback control mechanism having a proportional air control valve that controls a pneumatic pump supplying water to the apparatus.

Referring to FIG. 9, there is shown another feedback and control mechanism. In the depicted embodiment, the control system 700 includes a pressure sensor 705 and control logic system 710 in conjunction with a proportional air control valve 715. The pressure of the carbon dioxide at the inline carbonator 10 is sensed continuously and is fed back into the electronic control system 710. The carbon dioxide pressure and control logic based in the electronic control system 710 adjusts a proportional air control valve 715 that dynamically adjusts the carbon dioxide pressure entering a pneumatic water pump 720. In this manner a constant carbon dioxide to water pressure differential as described above may be maintained.

A method of forming a carbonated beverage is also provided. The method includes the steps of providing a water supply 30 and carbon dioxide supply 50 that is linked to an inline carbonation apparatus 10. The inline carbonation apparatus 10 includes a fluid tube 15 having an inner diameter 20. At least one water orifice 25 is linked to the water source 30 and is attached at one end of the fluid tube 15. The water orifice 25 has a plurality of holes 40 atomizing water passing therethrough. A carbon dioxide orifice 45 is linked to a carbon dioxide source 50 and is attached to the fluid tube 15 in a spaced relationship from the water orifice 25. The method includes introducing water and carbon dioxide into the inline carbonation apparatus 10 at a specified pressure forming carbonated water having a specified volume of carbonation.

In one aspect, the method includes atomizing water such that it has a pressure less than carbon dioxide introduced through the carbon dioxide orifice 45 such that carbon dioxide is absorbed into the water forming carbonated water having a specified volume of carbonation. In one aspect, the method includes spacing the water orifice 25 from the carbon dioxide orifice 45 a distance of from one quarter to three quarters of the diameter 20 of the fluid tube 15. Additionally, the method may include providing water and carbon dioxide at various pressures to form specific volume fractions of carbonation within a carbonated water. In one aspect, a pressure difference between the atomized water and carbon dioxide may be from 5 to 20 psi forming carbonated water having from 2 to 3 volumes of carbonation. Alternatively, a pressure difference between the atomized water and carbon dioxide may be maintained from 30 to 40 psi forming carbonated water having from 3 to 4.5 volumes of carbonation.

The method as stated above may also include supplying water and carbon dioxide at various pressures. In one aspect, the water orifice may have a pressure of from 80 to 150 psi and the carbon dioxide introduced into the carbon dioxide orifice may have a pressure of from 50 to 120 psi. Alternatively, the water orifice may have a pressure of from 40 to 80 psi and the carbon dioxide introduced into the carbon dioxide orifice may have a pressure of from 20 to 60 psi.

The method of the present invention may also include mixing carbonated water formed in the inline carbonation apparatus 10 in a desired ratio with a flavor and dispensing as a carbonated beverage. Various volume fractions of carbonated water may be utilized to form different beverages. Additionally, the method may include the step of bypassing the inline carbonator 10 such that non carbonated water is supplied and dispensed in a non carbonated beverage.

Figure 10:
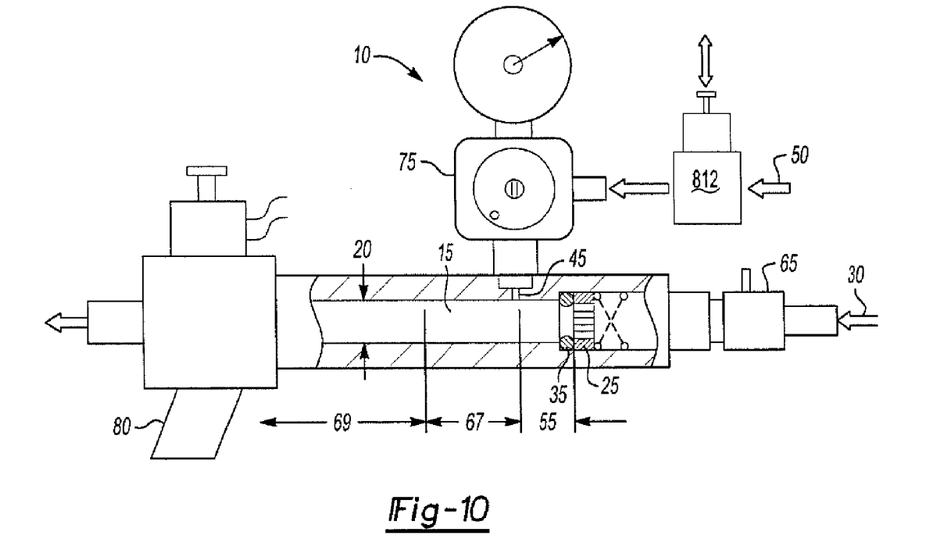
FIG. 10 is a schematic side view of an inline carbonation apparatus including a carbon dioxide solenoid valve connected to the regulator.

Referring to FIGS. 10-13, there is shown another alternative embodiment of an inline carbonation apparatus 810 and a beverage dispensing apparatus 822 in which a variable amount of carbonation may be provided. Referring to FIG. 10, there is shown an inline carbonation apparatus 810 that includes a fluid tube 15 having an inner diameter 20 and at least one water orifice 25 that is linked to a water source 30. The water orifice 25 is attached at one end of the fluid tube 15 and includes a plurality of holes that atomize water passing therethrough. A carbon dioxide source 50 is connected to a carbon dioxide solenoid valve 812. The carbon dioxide solenoid valve 812 is connected to a carbon dioxide regulator 75 that is coupled to a carbon dioxide orifice 45. The carbon dioxide orifice 45 is attached to the fluid tube 15 in a spaced relationship from the water orifice 25 such that the atomized water has a pressure less than the carbon dioxide such that carbon dioxide is absorbed into the water. In one aspect, the carbon dioxide solenoid valve 812 is opened and closed for a predetermined portion of a drink dispense time providing a volume of carbonated and non-carbonated fluid which upon mixing achieves a desired carbonation level.

In one aspect, the solenoid valve 812 may be a low voltage solenoid such as a 5, 12 or 24 volt DC solenoid assembled before the regulator and check valve 75 that feeds into the inline carbonator apparatus 810. The $CO_2$ or carbon dioxide solenoid valve 812 on or open time is provided by the flow controls, as will be discussed in more detail below.

In one aspect, for a given drink dispense time the solenoid valve 812 is turned on and off such that the valve opens and closes and supplies an amount of $CO_2$ for a definite amount of time. In this manner, carbonation is introduced into the water source 30 when the solenoid valve is open. The uncarbonated water produced when the solenoid valve 812 is closed mixes with the carbonated water to achieve a desired carbonation level. In one aspect, the flow control may be based on a relationship between the drink dispense size and time and the time that the solenoid $CO_2$ valve 812 is open or closed. In one aspect, a flow rate may be provided as an assumption such as for example 2.5 ounces per second. An increase or decrease in the drink flow rate will have a corresponding increase or decrease of the $CO_2$ solenoid 812 on time for a given or desired carbonation volume. As can be seen in the chart presented below, various volumes of carbonation may be specified with a corresponding $CO_2$ solenoid on time drink dispense time, and carbonated water volume. Various charts may be prepared for different flow rates and for different carbonation volumes and drink sizes.

| | | Correlation chart-Carb water Flow rate: 2.5 oz/s | | | | |
|---|---|---|---|---|---|---|
| | | Vol of CO2 | | | | |
| Carbonated Water Volume (oz) | Drink Dispense time (sec) | 1.5 (±0.25) | 2 (±0.25) | 2.5 (±0.25) | 3 (±0.25) | 3.5 (±0.25) |
| | | CO2 solenoid ON time (sec) | | | | |
| 8 | 3.2 | 0.14 | 0.41 | 1.48 | 2.38 | 3.19 |
| 10 | 4.0 | 0.17 | 0.51 | 1.86 | 2.98 | 3.99 |
| 12 | 4.8 | 0.21 | 0.61 | 2.23 | 3.57 | 4.79 |
| 16 | 6.4 | 0.28 | 0.82 | 2.97 | 4.77 | 6.39 |
| 18 | 7.2 | 0.31 | 0.92 | 3.34 | 5.36 | 7.19 |
| 22 | 8.8 | 0.38 | 1.13 | 4.08 | 6.55 | 8.78 |
| 24 | 9.6 | 0.42 | 1.23 | 4.45 | 7.15 | 9.58 |
| 32 | 12.8 | 0.56 | 1.64 | 5.94 | 9.53 | 12.78 |

Alternatively, the solenoid valve 812 that is assembled with the inline carbonation apparatus 810 may be continuously pulsed or rapidly switched off and on to open and close the $CO_2$ solenoid valve 812 during the entire drink dispense time to provide a specified volume of carbonation. The pulsing of the solenoid valve 812 will cause a portion or specified amount of the water source introduced into the inline carbonation apparatus to become carbonated during the dispensing with a corresponding non-carbonated portion of water when the solenoid is closed. However, as described above the final or dispensed fluid will be carbonated to a specified volume due to the volumetric mixing of a carbonated and non-carbonated fluid. Again, various relationships such as that provided in the chart specified above may be utilized to control the solenoid valve 812 on time whether it be pulsed or on and off for a specified time.

Figure 11:
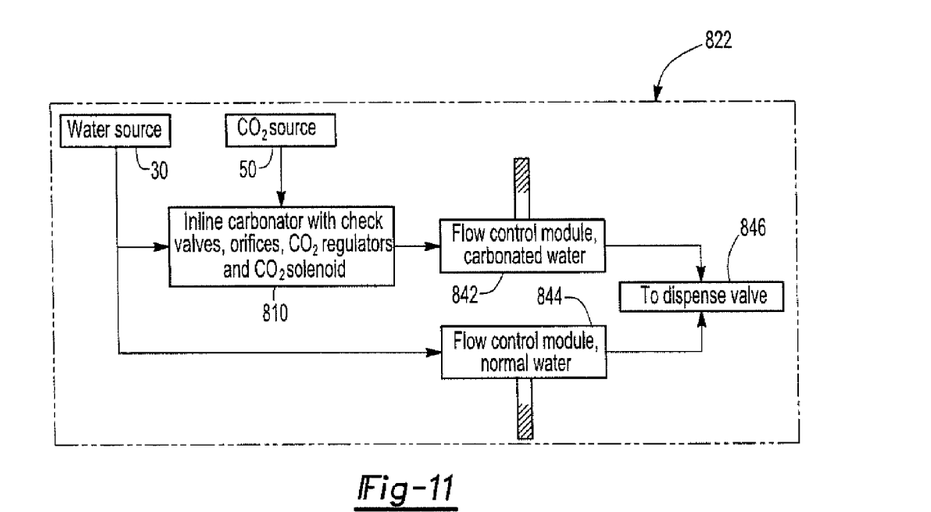
FIG. 11 is a block diagram of a beverage dispensing system including an inline carbonator having a $CO_2$ solenoid valve connected to the regulator and flow controls for water and a carbonated fluid linked to a dispense valve.

Referring to FIG. 11, there is shown an alternate embodiment of a beverage dispensing apparatus 822 that includes the inline carbonation apparatus 810 having a carbon dioxide solenoid valve 812 as described above. In one aspect, a water source 30 may be coupled to both the inline carbonation apparatus 810 and to a flow control module for water 844. Additionally, the inline carbonator 810 including the solenoid valve 812 may be coupled to a $CO_2$ source 50 as described above. A flow control for the carbonation 842 is coupled to the inline carbonation apparatus 810. Both the water and carbonation flow control modules 844, 842 or mechanisms are coupled to a dispensing or dispense valve 846. The inline carbonation apparatus 810 may be utilized to generate carbonated water for a desired carbonation level as described above. The carbonated water is then fed into the carbonation flow control module 842 with a flow rate that may be adjusted. The water source additionally sends fluid to the water control module 844 again which may be adjusted to various flow rates. In this manner, a defined portion of carbonated and non-carbonated fluid is dispensed through the dispense valve 846 to provide a fluid having a desired carbonation level. The ratio of carbonated to non-carbonated fluid in the final dispensed drink may be determined by a ratio of the flow rates.

Figure 12:
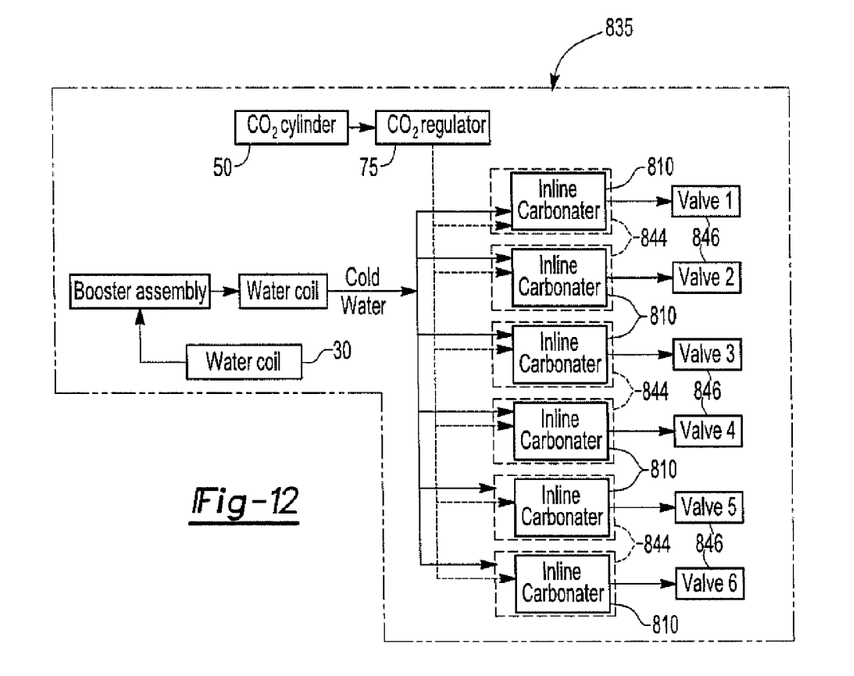
FIG. 12 is a block diagram of a beverage dispensing system including a plurality of inline carbonators having a $CO_2$ solenoid valve connected to the regulator and flow controls for water and a carbonated fluid linked to a multiple dispense valve.

Referring to FIG. 12, there is shown another beverage dispensing apparatus embodiment 832. In the depicted embodiment, a plurality of inline carbonation apparatus 810 is provided that each link to a dispensing valve 846. A water source and $CO_2$ source 30, 50 are coupled to each of the inline carbonation apparatus 810 that include the $CO_2$ or carbon dioxide solenoid valve 812 as described above. In one aspect, each of the plurality of inline carbonators 810 can be preset to a specific flow rate and carbonation volume. In this manner various carbonation levels may be provided in a single beverage dispensing apparatus 832 based on a predetermined volume of carbonation desired.

Figure 13:
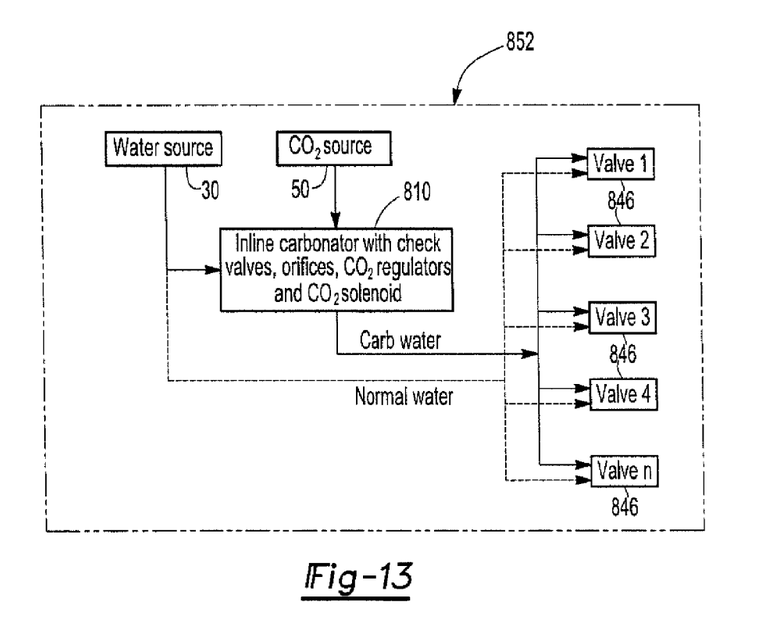
FIG. 13 is a block diagram of a beverage dispensing system including an inline carbonator having a $CO_2$ solenoid valve connected to the regulator and flow controls for water and a carbonated fluid linked to multiple dispense valves.

Referring to FIG. 13, there is shown another alternative embodiment of a beverage dispensing apparatus 852. In the depicted embodiment, a single inline carbonation apparatus 810 including the $CO_2$ solenoid valve 812 provides a source of carbonated fluid for multiple drink dispense valves 846. As can be seen in the depicted embodiment, a $CO_2$ source 50 and water source 30 are coupled to the inline carbonation apparatus 810. Additionally, the water source is coupled to the dispensing valves 846 with the use of a water control 844 and a carbonated flow control 842 that are connected to the individual dispense valves 846. In this manner, the inline carbonation apparatus 810 may be preset to a specific flow rate and carbonation volume that may be diluted and mixed with a specified volume from the water source to provide a fluid having a desired carbonation level to the various dispense valves.

A method of forming a carbonated beverage is also disclosed with reference to the embodiment of the inline carbonation apparatus disclosed in FIGS. 10-13. In one aspect, the method includes the steps of providing a water supply 30 and carbon dioxide supply 50 that are linked to at least one inline carbonation apparatus 810. The carbonation apparatus 810 includes a fluid tube 15 having an inner diameter 20 and at least one water orifice 25 linked to a water source 30 and attached at one end of the fluid tube 15. The water orifice 25 includes a plurality of holes 40 that atomize water passing therethrough. A carbon dioxide source 50 is connected to a carbon dioxide solenoid valve 812. The carbon dioxide solenoid valve 812 is connected to a carbon dioxide regulator 75 that is again coupled to a carbon dioxide orifice 45 and is attached to the fluid tube 15 in a spaced relationship from the water orifice 25. Water is then introduced with carbon dioxide into the inline carbonation apparatus 810 and the opening and closing of the carbon dioxide solenoid valve 812 provides a predetermined portion of carbonated fluid based on a drink dispense time such that a specified volume and level of carbonation is provided. As described above, the solenoid valve 812 may be opened and closed for a specified duration or may be pulsed during the drink dispense time to provide a fluid having a desired carbonation level. Additionally as provided above, the method includes providing a volume of carbonated and non-carbonated fluid which upon mixing achieves a desired carbonation level. Various numbers of inline carbonation apparatus 810 may be provided such that the method includes utilizing a single or multiple inline carbonation apparatus 810 coupled to various numbers of dispensing valves 846. Additionally, as described above the inline carbonation apparatus 810 may be linked with water flow controls 844 and carbonated flow controls 842 such that the water and carbonated flow controls adjust the volume of carbonated and non-carbonated fluid to provide a desired carbonation level.

The invention claimed is:

1. An inline carbonation apparatus comprising:
   a fluid conduit having an upstream end, a downstream end, and an inner diameter;
   a water source configured to supply a steam of water to the upstream end;
   wherein the fluid conduit has a water orifice through which the stream of water passes, the water orifice defining a plurality of holes that are configured to atomize the stream of water; and
   a carbon dioxide source that is configured to introduce a specified volume of carbon dioxide into the atomized stream of water via a carbon dioxide orifice that is located downstream of the water orifice;
   a carbon dioxide regulator that is configured to regulate the introduction of the specified volume of carbon dioxide into the atomized stream of water;
   wherein the water orifice is configured to cause the atomized stream of water to have a pressure that is less than a pressure of the carbon dioxide so that the carbon dioxide is adsorbed into the atomized stream of water and thereby produces a carbonated stream of water having a predetermined volume of carbonation;
   a solenoid valve connected to the carbon dioxide source and to the carbon dioxide regulator, wherein the solenoid valve is configured to open and close for a predetermined portion of a drink dispense time to thereby provide the specified volume of carbon dioxide, which upon adsorption in the atomized stream of water produces the carbonated stream of water having the predetermined volume of carbonation, wherein non-carbonated water is produced when the solenoid valve is closed and wherein carbonated water is produced when the solenoid valve is open; and
   a flow controller that controls the opening and closing of the solenoid valve based upon a drink dispense flow rate.

2. The apparatus according to claim 1, wherein the flow controller controls the opening and closing of the solenoid valve in pulses to produce the carbonated stream of water having the predetermined volume of carbonation.

3. The apparatus according to claim 1, comprising a dispenser valve, wherein the water source is configured to supply a steam of non-carbonated water in parallel to (A) the upstream end of the fluid conduit and (B) the dispenser valve.

4. The apparatus according to claim 3, wherein the dispenser valve is configured to alternately dispense the carbonated stream of water from the fluid conduit and the non-carbonated water.

5. The apparatus according to claim 4, comprising a flow control module receiving the non-carbonated water from the water source and supplying the non-carbonated water to the dispenser valve.

6. The apparatus according to claim 1, wherein the carbon dioxide orifice is spaced from the water orifice by a distance of one-quarter to three-quarters of the diameter of the fluid conduit.

7. The apparatus according to claim 1, wherein each hole in the plurality of holes of the water orifice has a size of from 0.6 to 2.0 millimeters.

8. The apparatus according to claim 1, wherein the carbon dioxide orifice comprises a plurality of holes, each hole in the plurality or holes having a size of from 1 to 3 millimeters.

9. The apparatus according to claim 1, wherein a pressure difference between the atomized stream of water and the carbon dioxide is from 5 to 20 psi so that the carbonated stream of water has from 2 to 3 volumes of carbonation.

10. The apparatus according to claim 1, wherein a pressure difference between the atomized stream of water and the carbon dioxide is from 30 to 40 psi so that the carbonated stream of water has from 3 to 4.5 volumes of carbonation.

11. The apparatus according to claim 1, wherein the stream of water provided to the upstream end has a pressure of from 80 to 150 psi and wherein the carbon dioxide has a pressure of from 50 to 120 psi, so that the carbonated stream of water has from 3 to 4.5 volumes of carbonation.

12. The apparatus according to claim 1, wherein the stream of water provided to the upstream end of the conduit has a pressure of from 40 to 80 psi and the carbon dioxide introduced to the carbon dioxide orifice has a pressure of from 20 to 60 psi, so that the carbonated stream of water has from 2 to 3 volumes of carbonation.

13. The apparatus according to claim 1, wherein at least one of the water orifice and the carbon dioxide orifice comprises a removable orifice plate.

14. The apparatus according to claim 1, comprising a water check valve connected to the water supply and connected to the water orifice, wherein the water check valve prevents back flow of carbonated water into the water supply.

15. The apparatus according to claim 1, comprising, a carbon dioxide check valve connected to the carbon dioxide supply and connected to the carbon dioxide orifice, wherein the carbon dioxide check valve has a cracking pressure of less than 5 psi.

16. The apparatus according to claim 1, comprising a dispensing valve, and further comprising a solenoid valve attached to the fluid conduit, the solenoid valve preventing dispensing of non-carbonated water and linking the fluid conduit to the dispensing valve.

17. The apparatus according to claim 16, wherein the solenoid valve is positioned a distance of from 4 to 12 times the diameter of the fluid conduit from the carbon dioxide orifice.

18. The apparatus according to claim 1, comprising a splitting manifold connecting the water source to a water check valve that separates a non-carbonated water source for dispensing.

19. The apparatus according to claim 1, wherein the fluid conduit comprises a first free jet zone defined by a spacing between the water orifice and the carbon dioxide orifice of from one quarter to three quarters of the diameter of the fluid tube, a second mixing zone defined by the carbon dioxide orifice and a spacing of from one to six times the inner diameter of the fluid conduit, wherein the atomized stream of water has a pressure less than the carbon dioxide such that carbon dioxide is absorbed into the stream of water forming the carbonated stream of water having the predetermined volume of carbonation, and a third pipe flow zone defined by an end of the mixing zone transporting the carbonated stream of water.

20. A method of carbonating, the method comprising:
supplying a stream of water to a fluid conduit having an upstream end, a downstream end, and an inner diameter, wherein the fluid conduit has a water orifice through which the stream of water passes, the water orifice defining a plurality of holes that are configured to atomize the stream of water;
introducing a specified volume of carbon dioxide into the atomized stream of water via a carbon dioxide orifice that is located downstream of the water orifice;
wherein the water orifice causes the atomized stream of water to have a pressure that is less than a pressure of the carbon dioxide so that the carbon dioxide is adsorbed into the atomized stream of water and thereby produces a carbonated stream of water having a predetermined volume of carbonation;
regulating the introduction of the specified volume of carbon dioxide into the atomized stream of water with a carbon dioxide regulator;
opening and closing a solenoid valve connected to the carbon dioxide regulator for a predetermined portion of a drink dispense time to provide the specified volume of carbon dioxide, which upon adsorption in the atomized stream of water produces the carbonated stream of water having the predetermined volume of carbonation, wherein non-carbonated water is produced when the solenoid valve is closed and wherein carbonated water is produced when the solenoid valve is open; and
controlling the opening and closing of the solenoid valve based upon a drink dispense flow rate.

21. The method according to claim 20, comprising controlling the opening and closing of the solenoid valve in pulses to produce the carbonated stream of water having the predetermined volume of carbonation.

22. The method according to claim 21, comprising supplying a steam of non-carbonated water in parallel to (A) the upstream end of the fluid conduit and (B) a dispenser valve.

* * * * *

UNITED STATES PATENT AND TRADEMARK OFFICE
CERTIFICATE OF CORRECTION

PATENT NO. : 8,882,084 B2
APPLICATION NO. : 13/337397
DATED : November 11, 2014
INVENTOR(S) : Malagi et al.

It is certified that error appears in the above-identified patent and that said Letters Patent is hereby corrected as shown below:

Title Page, Item (75) Inventors:

should read

--(75) Inventors: Jayateertha Malagi, Karnataka (IN); Servesh Adderi Ranganath, Karnataka (IN); Santhosh Kumar, Napervill, IL (US)--.

Signed and Sealed this
First Day of September, 2015

Michelle K. Lee
*Director of the United States Patent and Trademark Office*